United States Patent Office 3,513,132
Patented May 19, 1970

3,513,132
ADHESIVES FROM OLEFINICALLY UN-
SATURATED POLYESTERS AND POLY-
THIOLS
James T. Edmonds, Jr., Bartlesville, Okla., assignor to
Phillips Petroleum Company, a corporation of Delaware
No Drawing. Filed Sept. 14, 1966, Ser. No. 579,205
Int. Cl. C08g 17/12, 33/10; C09i 3/16
U.S. Cl. 260—75    7 Claims

ABSTRACT OF THE DISCLOSURE

Olefinically unsaturated polyesters of polyhydric alcohols or phenols are contacted with a polythiol for a time sufficient to form an adhesive composition in the absence of an oxidizing atmosphere, and in the presence of a base, which promotes a cross-linking reaction. The novel composition of matter which results is useful as an adhesive.

This invention relates to a new adhesive composition, and to a method of making said composition.

In one aspect, the invention relates to a method of making a novel adhesive composition by contacting a mixture comprising an olefinically unsaturated polyester, a polythiol, and a base, in the absence of an oxidizing atmosphere, for a time sufficient to form said adhesive.

In another of its aspects, the invention relates to a novel adhesive composition comprising the reaction product of an olefinically unsaturated polyester of a polyhydric alcohol or phenol and a polythiol in the presence of a base, wherein said reaction product is free from disulfide groups.

In another of its aspects, the invention relates to the promotion of the reaction between an olefinically unsaturated polyester of a polyhydric alcohol or phenol and a polythiol by contacting a mixture of said unsaturated polyester and said polythiol with a base in the absence of an oxidizing atmosphere at relatively low temperature for a time sufficient to form said adhesive.

Polymers made from unsaturated polycarboxylic acids and polyhydric alcohols have been known for a long time. It is also known to cure these esters by sulfur in what may be considered a vulcanization reaction. The treatment of polyunsaturated esters with polythiols has also been known in the art for some time. It is also known that the epoxy resins, in general, are useful structural adhesives.

It is an object of this invention to provide a novel adhesive composition comparable in lap shear strength to the well known epoxy resins. It is also an object of this invention to provide a novel adhesive composition that cures quickly at relatively low temperatures without oxidation of the components. It is also an object of this invention to provide an adhesive composition which effectively bonds disparate substrates such as glass and cloth.

Other aspects, objects, and the several advantages of this invention are apparent to one skilled in the art upon a reading of this disclosure and the appended claims.

In accordance with the invention, an olefincially unsaturated polyester of a polyhydric alcohol or phenol is contacted with a polythiol for a time sufficient to form an adhesive composition in the absence of an oxidizing atmosphere, and in the presence of a base, which promotes a crosslinking reaction. By this method, a novel composition of matter useful as an adhesive is produced, comprising the reaction product of an olefinically unsaturated polyester and a polythiol, said composition being free of disulfide groups. Said composition also contains a base, which serves to accelerate the cross-linking process. Exclusion of an oxidizing atmosphere is important to the process of this invention because oxygen, or any gas containing oxygen, tends to oxidize the thiol groups to disulfide groups, which diminishes the adhesive properties of the composition.

The olefinically unsaturated polyester which forms one component of the adhesive composition can be made by contacting a compound selected from olefinically unsaturated polycarboxylic acids and anhydrides thereof with a compound selected from polyhydric alcohols and phenols such as the glycols, glycerols, dihydric phenols, or pentaerythritol. An esterification catalyst such as benzenesulfonic acid or p-toluenesulfonic acid can be employed. If desired, a free radical scavenger such as hydroquinone or 4-tert-butylcatechol can be added to the reaction mixture to prevent gelation by free radical polymerization at the double bonds during preparation of the polyester.

Although the reaction is conventionally carried out in the absence of a solvent, it can be carried out in an aromatic or saturated paraffinic or cycloparaffinic solvent such as benzene, toluene, xylenes, heptane, octane, decane, cyclohexane, or the like. The olefinically unsaturated polyester is readily prepared by carrying out the esterification at a temperature within the range of about 80–250° C. for a period of time which is usually within the range of about 10 minutes to about 12 hours, preferably in an atmosphere substantially free of oxygen.

Although olefinically unsaturated polycarboxylic acids and their anhydrides in general are applicable in the preparation of the olefinically unsaturated polyesters, the preferred acids and anhydrides have 4 to about 12 carbon atoms and are selected from (a) unsubstituted, olefinically unsaturated acyclic dicarboxylic acids and their anhydrides, (b) unsubstituted, olefinically unsaturated alicyclic dicarboxylic acids and their anhydrides, (c) hydrocarbyl-substituted olefinically unsaturated acyclic dicarboxylic acids and their anhydrides, (d) hydrocarbyl-substituted olefinically unsaturated alicyclic dicarboxylic acids and their anhydrides, and (e) mixtures thereof. Preferably, the hydrocarbyl substituent is an alkyl, cycloalkyl, or aryl radical. Examples of some of the preferred olefinically unsaturated polycarboxylic acids and their anhydrides include maleic anhydride, maleic acid, fumaric acid, itaconic acid, itaconic anhydride, mesaconic acid, dimethylfumaric acid, cis-muconic acid, trans-muconic acid, citraconic acid, citraconic anhydride, phenylmaleic acid, cyclopentylmaleic acid, 6-dodecenedioic acid, 3-cyclohexene-1,2-dicarboxylic acid, 1-cyclopentene-1,2-dicarboxylic anhydride, 4-methyl-1-cyclohexene-1,2-dicarboxylic acid, 3-methyl-4-cyclohexene-1,2-dicarboxylic anhydride, and the like, and mixtures thereof. If desired, other polycarboxylic acids and anhydrides such as succinic acid, succinic anhydride, glutaric acid, adipic acid, sebacic acid, dodecanedioic aid, 1,4-cyclohexanedicarboxylic acid, terephthalic acid, isophthalic acid, phthalic acid, phthalic anhydride, and the like, and mixtures thereof, can be employed with the olefinically unsaturated polycarboxylic acids and anhydrides. For example, as illustrated in Example I, sebacic acid and maleic anhydride can be used in combination to form the olefinically unsaturated polyester.

Although polyhydric alcohols and phenols in general are applicable in the preparation of the olefinically unsaturated polyesters, the preferred compounds selected from polyhydric alcohols and phenols are those having 2 to about 15 carbon atoms. Other substituents can be present provided they do not interfere with the formation of the adhesives of the invention. Examples of some polyhydric alcohols and phenols which can be employed include glycerine, erythritol, pentaerythritol, arabitol, xylitol, adonitol, mannitol, dulcitol, sorbitol, pentaglycerine, xylylene glycols, ethylene glycol, diethylene glycol, triethylene glycol, tetraethylene glycol, pentaethylene glycol, trimethylene glycol, tetramethylene glycol, nonamethylene glycol, undecamethylene glycol, pentadecamethylene glycol, isobutylene glycol, 2,2-dimethyltrimethylene glycol, 1,2-butanediol, 1,3-butanediol, 3-methyl-1,3-butanediol, 2,3-butanediol, pinacol, 2-ethyl-1,3-hexanediol, catechol, resorcinol, hydroquinone, 4,4'-dihydroxybiphenyl, 4,4'-isopropylidenediphenol, and the like, and mixtures thereof.

Although polythiols of higher molecular weight can be used in the reaction with the olefinically unsaturated polyesters to give useful adhesive compositions, the preferred polythiols have 2 to about 20 carbon atoms, more desirably having 3 to about 20 carbon atoms. The number of mercapto groups in the plythiol molecule is preferably within the range of 2 to about 6, more desirably being 3 or 4. The mercapto groups of the polythiol can be attached to a hydrocarbon radical selected from the groups consisting of saturated aliphatic, saturated cycloaliphatic, and aromatic radicals and combinations thereof such as aryl-substituted aliphatic radicals, alkyl-substituted aromatic radicals, and the like. Additionally, the polythiol molecule can contain other groups or linkages such as ester groups, ether linkages, sulfide linkages, or the like which do not interfere with the reaction of the polythiol with the olefinically unsaturated polyester to give a desired adhesive composition. Examples of polythiols suitable for use in accordance with the invention include 1,2-ethanedithiol, 1,2,3-propanetrithiol, 1,2,4-butanetrithiol, 1,2,3,4-butanetetrathiol, 1,2,3-pentanetrithiol, 3-methyl-1,2,3-heptanetrithiol, 1,2,10-decanetrithiol, 1,2,3,5,6-dodecanepentathiol, 1,2,4,5,7,8-hexadecanehexathiol, 2,3,5,8-eicosanetetrathiol, 1,2,3-cyclopentanetrithiol, 1,2,3,4-cyclohexanetetrathiol, 2-ethyl-1,2,3,4-cyclooctanetetrathiol, 3 - (2-mercaptoethyl)-cyclohexanethiol, 4-(2-mercaptoethyl)cyclohexanethiol, 2-cyclohexyl-1,3,4-butanetrithiol, 1,2,3-benzenetrithiol, 1,2,4,5-benzenetetrathiol, toluene-2,3,4-trithiol, toluene-α,2,3,4-tetrathiol, 2-phenyl-1,3,6-hexanetrithiol, tris(mercaptoacetate) of glycerine, tris(3-mercaptopropionate) of gylcerine, tetrakis(3-mercaptopropionate) of pentaerythritol, bis(2-mercaptoethyl) ether, bis(3-mercaptopropyl) sulfide, and the like, and mixtures thereof.

Bases in general can be used as activators to catalyze the reaction of the polythiols with the olefinically unsaturated polyesters to produce cured, or crosslinked, adhesive compositions. Examples of some suitable bases include ammonia, phosphines, and the alkali and alkaline earth oxides, hydroxides, and carbonates. However, the preferred base is an amine having 1 to about 24 carbon atoms, more desirably having about 3 to about 18 carbon atoms. The amines can be primary, secondray, or tertiary amines, and they can be saturated aliphatic, saturated cycloaliphatic, aromatic, or heterocyclic amines. Examples of some suitable amines includes methylamine, propylamine, trimethylamine, triethylamine, tripropylamine, tributylamine, triamylamine, trihexylamine, trioctylamine, dipropylamine, dibutylamine, diamylamine, N-methylbutylamine, dibenzylamine, tribenzylamine, N,N - dimethylaniline, N,N - diethylaniline, cyclopentylamine, pyridine, quinoline, α-naphthylamine, N,N'-dicyclohexylpiperazine, piperidine, ethylenediamine, and the like, and mixtures thereof.

Although the ratio of polythiol to olefinically unsaturated polyester used in the preparation of the adhesive compositions of this invention can vary over a wide range, the weight ratio of polythiol to polyester will generally be within the range of from about 0.1:1 to about 1:1, usually being within the range of from about 0.2:1 to about 0.6:1. When an amine is employed as the base, the weight ratio of amine to the combination of polythiol and polyester will generally be within the range of from about 0.001:1 to about 0.06:1, usually being within the range of from about 0.002:1 to about 0.04:1. The curing process is generally carried out at temperatures within the range of from about 20° C. to about 250° C., usually within the range of from about 60° C. to about 200° C. The period of time required for curing will vary considerably, depending in part on the temperature, but will generally be within the range of from about 1 minute to about 1 week, usually being within the range of from about 10 minutes to about 24 hours.

EXAMPLE I

Poly-1,2-propylene sebacate-maleate was prepared by condensation of equimolar quantities of sebacic acid (2 mols) and maleic anhydride (2 mols) with a 5 mol percent excess of 1,2-propylene glycol (4.2 mols). The condensation was run in refluxing toluene (100 ml.) under nitrogen and water of condensation was removed by azeotropic distillation. A 1.25 mol percent level of p-toluenesulfonic acid based on total reactants was effective as an esterification catalyst and 0.10 weight percent hydroquinone was added to prevent gelation by free radical polymerization at the double bonds during the resin preparation. The reaction required about 5 hours to recover the theoretical amount of water of condensatin at which point the toluene was stripped off under vacuum leaving a light straw colored, clear, highly viscous liquid at room temperature. Molecular weight by osmometry was 1414 and an acid number analysis showed 8.0 mg. KOH/gram polymer, indicating a low level of free carboxyl terminal groups. Based on this data, the polymer had an average repeat unit structure of the fololwing had an average repeat unit structure of the following with a molecular weight per olefinic double bond of 398:

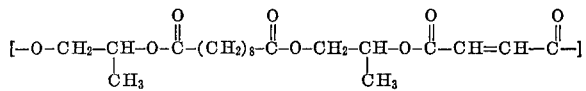

EXAMPLE II

To include a polyester resin containing aromatic linkages a 1:1 poly-1,2-propylene phthalate-maleate was prepared, using 2 mols of phthalic anhydride, 2 mols of maleic anhydride, and 4.2 mols of 1,2-propylene glycol. The general procedure was the same as that described above and a lemon yellow, clear resin was obtained in about 5 hours which at room temperature was a brittle, glassy solid. Analysis showed a molecular weight of 1300 and an acid number of 120 mg. KOH/gram polymer. The polymer was calculated to have an average of 1 olefinic double bond for every 362 mass units. Based on the above data, the polymer had an average repeat unit structure as follows:

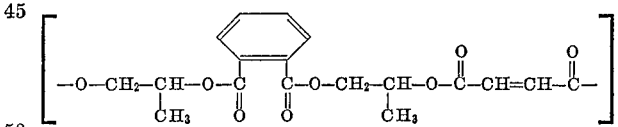

EXAMPLE III

In order to observe whether a higher crosslink density would have the expected influence on the bulk properties of the thiol-cured polyester system a maleate homo-polyester of dipropylene glycol was prepared by the same general procedure referred to above, using 3.06 mols of maleic anhydride and 3.21 mols of dipropylene glycol. The resin was again obtained in about 5 hours reaction time and at room temperature was an extremely viscous, light straw clear liquid. By analysis an acid number of 46 mg. KOH/gram polymer and an average molecular weight of 1140 was determined. Based on the average repeat unit structure shown below an equivalent weight per double bond of 238 was calculated:

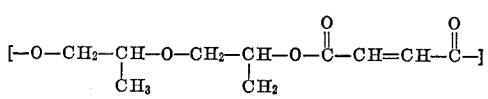

EXAMPLE IV

The tetrakis(3-mercaptopropionate) ester of pentaerythritol was prepared easily by condensing an excess of 3-mercaptopropionic acid (2.5 mols) with the tetra-ol (0.5 mol) in refluxing toluene using p-toluenesulfonic acid as esterification catalyst. By azeotropic distillation the theoretical amount of water of condensation was recovered in 5 hours and the crude reaction mixture was washed repeatedly with 10 percent aqueous sodium bicarbonate to neutralize free acid, then with pure water, and finally dried over $MgSO_4$. Removal of the toluene by stripping yielded a clear colorless oil of low odor in about 95 percent yield. Elemental analysis showed carbon=42.0 percent (calcd. 42.0), hydrogen=6.0 percent (calcd. 5.7), oxygen=25.0 percent (calcd. 26.2), and mercaptan sulfur=24.8 percent (calcd. 26.2). Thus, the product was the desired tetrathiol ester with a molecular weight of 488 and a thiol equivalent weight of 122.

EXAMPLE V

To provide a trithiol co-reactant, the tris(3-mercaptopropionate) ester of glycerine was prepared in a similar manner to that described above, using 3.5 mols of 3-mercaptopropionic acid and 1 mole of glycerine. The product was a light yellow, clear oil, slightly odoriferous, obtained in 68 percent yield (loss of product in washing). Analysis showed carbon=40.9 percent (calcd. 40.4), hydrogen=5.8 percent (calcd. 5.6), oxygen=27.9 percent (calcd. 27.0), and mercaptan sulfur=25.4 percent (calcd. 27.0). On this basis a molecular weight of 354 was assigned with a thiol equivalent weight of 118.

EXAMPLE VI

An equimolar mixture of maleic anhydride and ethylene glycol was heated in a nitrogen atmosphere until the temperature of the mixture reached about 230° C. The resulting olefinically unsaturated polyester was allowed to cool. Three parts by weight of the olefinically unsaturated polyester were then thoroughly mixed with one part by weight of the tetrakis(3-mercaptopropionate) ester of pentaerythritol and a weight of tri-n-butylamine equal to 4 percent of the combined weight of the polythiol and olefinically unsaturated polyester. The lap shear strength (ASTM D-1002-53T) of brass strips and of copper strip to which the mixture was applied and subsequently cured by heating at 150° C. for 1 hour was 1430 p.s.i. and 1920 p.s.i., respectively. The lap shear strength of iron strips to which the mixture was applied and subsequently cured by heating at 150° C. for 2 hours was 1775 p.s.i.

Other mixtures of olefinically unsaturated polyester resins and polythiol hardeners were tested by placing 20-25 gram quantities in small aluminum dishes and visibly observing the change in viscosity or onset of gelation with time at room temperature (RT) and at 75° C., using tri-n-butylamine as the curing agent. Hardness of the gelled or cured compositions was measured at room temperature with a shore penetrometer (A and D scales).

Bond strengths at room temperature were obtained from aluminum to aluminum lap shear specimens by the general procedure outlined in ASTM D-1002-53T. The aluminum coupons were cleaned before use by a standard hot alkaline wash and sulfuric acid-chromate wash. The cure schedule for lap shear bond specimens was 16 hours at 75° C. followed by 3 hours at 150° C.

The data are summarized in Table I.

The results indicate that a complete range of heat curable compositions can be formulated in this manner. The bond strengths vary from relatively weak to strong (42-2750 p.s.i.). The ultimate bond strength compares favorably with an expensive high grade commercial adhesive composition which has a gel time at room temperature of only 3-4 hours so that it must be used freshly prepared.

Preferentially, formulations of the type 4, 5, and 6 in Table I should be used in high strength adhesives. The composition of Example VI is also very effective and has been found to give a good glass cloth laminate.

TABLE I.—CURING CHARACTERISTICS AND LAP SHEAR BOND STRENGTHS FOR EXPERIMENTAL, POLYESTER-POLYTHIOL THERMOSET RESIN SYSTEMS

| Experiment number | Resin type | Hardener [a] type | Hardener [b] conc., p.p.hr. | Amine [c] activator conc., p.p.hr. | Gel time at RT, hr. |
|---|---|---|---|---|---|
| 1 | 1,2-propylene sebacate-maleate | PTE | 30.6 | 0.550 | [e] 24 |
|   |   |   |   | 1.100 | [e] 24 |
| 2 | do | GTE | 29.5 | 0.550 | 36 |
|   |   |   |   | 1.100 | 36 |
| 3 | 1,2-propylene phthalate-maleate | PTE | 33.8 | 0.275 | ---- |
|   |   |   |   | 0.0550 | ---- |
|   |   |   |   | 1.100 | ---- |
| 4 | do | GTE | 32.7 | 0.275 | ---- |
|   |   |   |   | 0.550 | ---- |
|   |   |   |   | 1.100 | ---- |
| 5 | 1,2-dipropylene ether maleate | PTE | 51.2 | 0.275 | [e] 24 |
|   |   |   |   | 0.550 | [e] 24 |
|   |   |   |   | 1.100 | [e] 24 |
| 6 | do | GTE | 49.6 | 0.275 | [e] 24 |
|   |   |   |   | 0.550 | [e] 24 |
|   |   |   |   | 1.100 | [e] 24 |

| Experiment number | Gel time at 75° C. | RT hardness [d] of cured resin | Appearance | Lap shear strength, p.s.i. | Ultimate bond deformation, in. |
|---|---|---|---|---|---|
| 1 | 1 hour | 25(65-70) | Pale green, clear rubbery | 48 | 0.011 |
|   | ½ hour | (2565-70) |   | 100 | 0.012 |
| 2 | 3 hours | 12-15(55-60) | do | 82 | 0.013 |
|   | 2 hours | 15-17(55-60) |   | 100 | ---- |
| 3 | 16 hours [f] | 55-60 | Pale green, clear rigid | 50 | 0.047 |
|   | do.[f] | 65-70 |   | 42 | 0.065 |
|   | do.[f] | 70-75 |   | 362 | 0.031 |
| 4 | 16 hours [f] | 15 | Pale yellow, green clear | 136 | 0.099 |
|   | do.[f] | 75-80 |   | 2,510 | 0.052 |
|   | do.[f] | 80-85 |   | 1,670 | 0.043 |
| 5 | 45 minutes | 15-20 | Clear and colorless | 2,750 | 0.057 |
|   | 30 minutes | 45-60 |   | 2,690 | 0.055 |
|   | 15 minutes | 55-60 |   | 2,480 | 0.042 |
| 6 | 3-4 hours | 45-50 | Light straw, clear rigid | 670 | 0.018 |
|   | 1½ hours | 75-80 |   | 1,120 | 0.029 |
|   | 30-45 minutes | 75-80 |   | 1,480 | 0.036 |

[a] PTE is tetrakis(3-mercaptopropionate) ester of pentaerythritol; GTE is tris(3-mercaptopropionate) ester of glycerine.
[b] Hardener concentration in parts per hunderd of polyester resin.
[c] Tri-n-butylamine activator concentration in parts per hundred of polyester-polythiol mixture.
[d] Cure Cycle; 16 hrs. at 75° C. plus 3 hrs. at 150° C. Numbers not in parentheses are Shore D penetrometer readings, numbers in parentheses refer to Shore A readings.
[e] Sample formed skin at air interface.
[f] Samples did not gel in 16 hrs./75° C.; all gelled in 30-60 minutes/150° C.

Reasonable variation and modification are possible within the spirit and scope of this invention, the essence of which is a method of making an adhesive material comprising contacting an unsaturated polyester of polyhydric alcohol or phenol, a polythiol, and a base, in the absence of an oxidizing atmosphere for a time sufficient to form said adhesive, and a novel adhesive composition resulting from said process.

I claim:

1. A method of preparing an adhesive composition comprising heating a mixture comprising:
   (1) an olefinically unsaturated polyester resin which is the reaction product of a compound selected from olefinically unsaturated polycarboxylic acids and anhydrides thereof and a compound selected from polyhydric alcohols and polyhydric phenols having 2–15 carbon atoms,
   (2) a polythiol having from about 2 to about 20 carbon atoms and from about 2 to about 6 mercapto groups per molecule with a weight ratio of polythiol to polyester within the range of from about 0.1:1 to about 1:1, and
   (3) an amine, the weight ratio of said amine to said polythiol and polyester being in the range of from about 0.001:1 to about 0.06:1, in an atmosphere free of oxygen or oxygen-containing gas and for a time sufficient to form said adhesive.

2. A method as defined in claim 1 wherein said olefinically unsaturated polycarboxylic acids and anhydrides thereof are selected from (a) unsubstituted, olefinically unsaturated acyclic dicarboxylic acids and their anhydrides, (b) unsubstituted, olefinically unsaturated alicyclic dicarboxylic acids and their anhydrides, (c) hydrocarbyl-substituted olefinically unsaturated acyclic dicarboxylic acids and their anhydrides, (d) hydrocarbyl-substituted olefinically unsaturated alicyclic dicarboxylic acids and their anhydrides, and (e) mixtures thereof, and wherein said polyhydric alcohols and phenols are selected from the glycols, glycerols, dihydric phenols, and pentaerythritol.

3. A method as defined in claim 2 wherein said olefinically unsaturated polyester is selected from 1,2-propylene sebacate-maleate, 1,2-propylene phthalate-maleate, and 1,2-dipropylene ether maleate, said polythiol is selected from tetrakis(3-mercaptopropionate) ester of pentaerythritol and tris(3-mercaptopropionate) ester of glycerine, and said amine is tri-n-butylamine.

4. A method as defined in claim 1 wherein said heating is carried out at a temperature within the range of from about 60° C. to about 200° C.

5. An adhesive composition of matter comprising (1) an olefinically unsaturated polyester of a compound selected from olefinically unsaturated polycarboxylic acids and anhydrides thereof and a compound selected from polyhydric alcohols and polyhydric phenols having 2–15 carbon atoms, crosslinked with (2) a polythiol, the weight ratio of polythiol having from about 2 to about 20 carbon atoms and from about 2 to about 6 mercapto groups per molecule to polyester being in the range of from about 0.1:1 to about 1:1, said polythiol being free of disulfide groups, and (3) an amine, the weight ratio of amine to the combination of polythiol and polyester being in the range of from about 0.001:1 to about 0.006:1.

6. A composition of matter as defined in claim 5 wherein said olefinically unsaturated polycarboxylic acids and anhydrides thereof are selected from (a) unsubstituted, olefinically unsaturated acyclic dicarboxylic acids and their anhydrides, (b) unsubstituted, olefinically unsaturated alicyclic dicarboxylic acids and their anhydrides, (c) hydrocarbyl-substituted olefinically unsaturated acyclic dicarboxylic acids and their anhydrides, (d) hydrocarbyl-substituted olefinically unsaturated alicyclic dicarboxylic acids and their anhydrides, and (e) mixtures thereof, and wherein said polyhydric alcohols and phenols are selected from glycols, glycerols, dihydric phenols, and pentaerythritol.

7. A composition of matter as defined in claim 6 wherein said olefinically unsaturated polyester is selected from 1,2-propylene sebacate-maleate, 1,2-propylene phthalate-maleate, and 1,2-dipropylene ether maleate, said polythiol is selected from tetrakis(3-mercaptopropionate) ester of pentaerythritol and tris(3-mercaptopropionate) ester of glycerine, and said amine is tri-n-butylamine.

References Cited

UNITED STATES PATENTS

| | | | |
|---|---|---|---|
| 2,411,954 | 12/1946 | Burke. | |
| 3,310,527 | 3/1967 | De Acetis et al. | |
| 3,333,021 | 7/1967 | Geipert | 260—863 |
| 3,369,040 | 2/1968 | De Acetis. | |
| 3,201,370 | 8/1965 | Butler et al. | 260—47 |

WILLIAM H. SHORT, Primary Examiner

L. P. QUAST, Assistant Examiner

U.S. Cl. X.R.

161—194, 214; 260—47